US012215759B2

(12) United States Patent
Gahr (10) Patent No.: US 12,215,759 B2
(45) Date of Patent: Feb. 4, 2025

(54) SHACKLE WITH POSITIVE LOCKING PIN MECHANISM

(71) Applicant: DEIS Products LLC, Austin, TX (US)

(72) Inventor: Joshua Z Gahr, Austin, TX (US)

(73) Assignee: DEIS Products LLC, Austin, TX (US)

( * ) Notice: Subject to any disclaimer, the term of this patent is extended or adjusted under 35 U.S.C. 154(b) by 210 days.

(21) Appl. No.: 17/971,581

(22) Filed: Oct. 22, 2022

(65) Prior Publication Data

US 2023/0130912 A1    Apr. 27, 2023

Related U.S. Application Data

(60) Provisional application No. 63/263,132, filed on Oct. 27, 2021.

(51) Int. Cl.
*F16G 15/06*    (2006.01)
*F16B 39/10*    (2006.01)

(52) U.S. Cl.
CPC .............. *F16G 15/06* (2013.01); *F16B 39/10* (2013.01)

(58) Field of Classification Search
CPC ................................ F16G 15/04; F16G 15/06
See application file for complete search history.

(56) References Cited

U.S. PATENT DOCUMENTS

| 3,883,170 A | 5/1975 | Fricker et al. |
| 7,997,056 B2 | 8/2011 | Segura |
| 9,726,255 B1* | 8/2017 | Tarrant ................. F16G 15/06 |
| 2006/0099838 A1* | 5/2006 | Meyers ................ F16G 15/06 |
| | | 439/134 |
| 2019/0309824 A1 | 10/2019 | Jackson et al. |
| 2023/0108292 A1* | 4/2023 | Benthien ............... F16B 39/02 |
| | | 244/129.1 |
| 2023/0130421 A1* | 4/2023 | Bjorgum ............... F16G 15/06 |
| | | 59/86 |

FOREIGN PATENT DOCUMENTS

| AU | 2016101941 A4 | 12/2016 |
| EP | 2745030 B1 | 6/2016 |
| WO | WO2018220512 A1 | 12/2018 |
| WO | WO2021194354 A1 | 9/2021 |

OTHER PUBLICATIONS

International Search Report and Written Opinion of the International Searching Authority, International Application No. PCT/US2022/047508, dated Jan. 31, 2023.

* cited by examiner

*Primary Examiner* — Jared O Brown
(74) *Attorney, Agent, or Firm* — Victor H. Segura (57) ABSTRACT

A shackle having a body with a bow portion, and first and second end portions. Each end portion having a pin opening. A pin is configured to fit through the pin openings, and a nut is configured with at least one locking ball to engage with the pin. A method of operating the shackle.

17 Claims, 6 Drawing Sheets

SHACKLE WITH POSITIVE LOCKING PIN MECHANISM

CROSS REFERENCE TO RELATED APPLICATIONS

Priority is claimed from U.S. Provisional Application No. 63/263,132 filed on Oct. 27, 2021, incorporated herein by reference in its entirety.

FIELD OF THE INVENTION

This disclosure relates generally to devices for securing a shackle pin to the body of the shackle. More particularly, the disclosure relates to a securing device that is capable of securing the pin of a shackle for an indefinite period of time where a shackle is employed as a suspending, securing, or lifting device in applications wherein such shackle may be exposed to movement or vibration.

BACKGROUND

A shackle is generally a U-shaped metal link secured with a pin or bolt across the opening designed to handle a rated load. Shackles are devices that are used as connecting links in all manner of rigging systems in many industries, from boats and ships to industrial crane rigging, as they allow different rigging subsets to be connected or disconnected quickly. Some shackles are used in temporary rigging to make lifts while other applications require shackles to remain in service for an extended period.

The shackle shape and load pin type are selected based on the complexity of the rigging, the duration of service, and the load to be lifted. Two commonly used shackles types are the anchor shackle (or bow shackle) and chain shackle (or D shackle) which differ in shape and application. The anchor shackle has an "O" shape with the shackle legs narrowing toward the pin end. The anchor shackle is designed to connect load lines or chains with forces imposed from various angles. The chain shackle is shaped like the oval link of a chain with a narrow profile. The chain shackle is designed to withstand high loads in-line with the shackle. Shackles are designed and manufactured to safely handle loads from tens of pounds to thousands of tons.

Both the anchor and chain shackle are manufactured to accept load pins through machined holes at the end of each shackle leg. The load pin is either a round pin, a screw pin, or a bolt-type load pin. A round pin is a simple pin with a head of larger diameter than the pin body and a hole for a retaining pin or cotter key drilled near the end opposite the head. The shackle ears need no special machining to accept a round pin. Upon installation, the round pin is pushed through both holes in the shackle legs and the retaining pin installed to secure the pin in the shackle. A screw pin has a larger diameter head on one end, typically with a tab protruding perpendicular to the head for tightening purposes, and a threaded end opposite the head. The shackle must have one of the holes in the shackle leg tapped to accept the threaded pin. Upon installation, the screw pin is placed through the smooth hole in one of the shackle legs and then screwed into the threaded hole on the other shackle leg. A bolt-type pin resembles a bolt with a threaded end for a securing nut and a through-hole drilled near to the threaded end for a retaining pin or cotter key. The holes at the end of each shackle leg have a smooth bore with no tapping required to accept a bolt-type pin. Upon installation the bolt-type pin is installed through both ears with some portion of threads protruding past the hole in the shackle leg, the retaining nut tightened onto the bolt, and a retaining key or cotter pin installed into the bolt.

Figure 1:
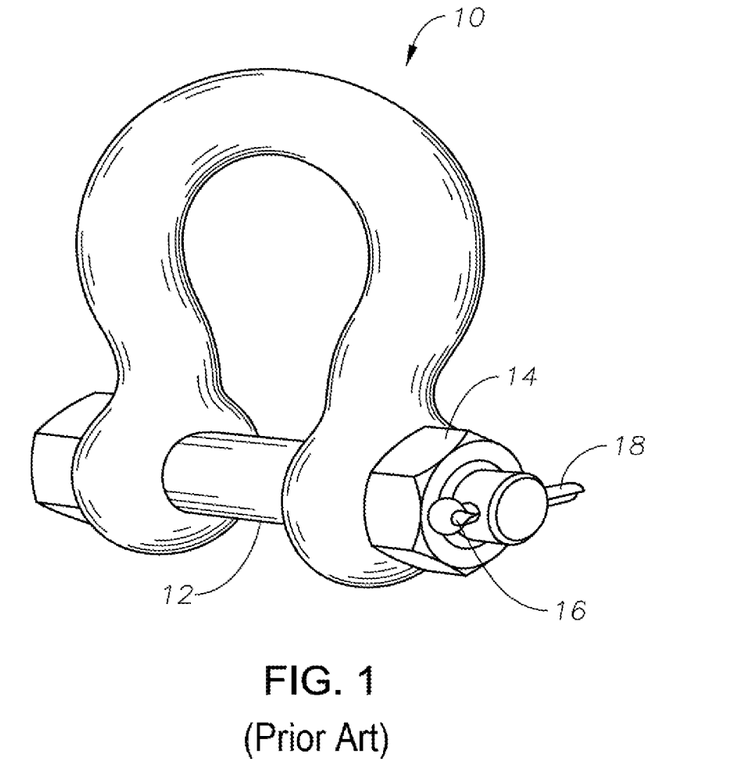
FIG. 1 shows a perspective view of a conventional shackle with a customary locking nut and securing pin.

FIG. 1 shows a conventional shackle 10 complete with a threaded pin 12, customary half-width securing hex nut 14, and a hole 16 for a retaining pin complete with a cotter pin 18 installed. In this type of installation, the shackle 10 is typically secured to slings or other equipment or lifting members, the pin 12 is installed through each hole in the shackle leg, the nut 14 is screwed onto the pin threads and adequately tightened, and the cotter pin 18 is installed through the hole 16 in the end of the pin.

While there are many variations of shackles designed for specific uses, a common issue is the failure of the load pin to remain securely fastened in the shackle. The sudden failure of shackles can cause work delays, equipment damage, or worse, human injury or death. This is a particular issue when shackles are used for extended durations to suspend machinery, equipment, sheaves, counterweights, or similar items of mass. Some of the reasons for failure of the load pin to remain securely fastened are the use of the wrong type of load pin, improper installation of retention devices, or incorrect materials used.

Selecting the incorrect type of load pin can result in load pin failure. For lifting and securing applications where loads are to remain suspended for an extended duration, most shackle manufacturers recommend the use of a bolt-type load pin with a secondary retaining pin or cotter key. In long-term applications, the improper use of round pin or screw pin load pins may result in the pin becoming unfastened due to loading cycles, vibration, rubbing, or corrosion that fail retention mechanisms or cause the loosening of threaded components.

Another reason for failure of load pins to remain securely fastened is improper installation of the load pin or pin retention mechanisms. High energy environments where continual motion, cycles, or vibration of a shackle occur increases the likelihood that load pins separate unexpectedly from a shackle. For screw pins the correct torque may not be applied to ensure the pin does not loosen during use, or a secondary retention mechanism such as a wire or tie-strap is either not used, incorrectly installed, or not robust enough to resist breakage. For bolt-type load pins the nut may not be properly torqued. For round pin or bolt-type load pins that use a cotter key or other retaining clip or wire, the retaining mechanism may be improperly sized (pin too small), improper for the application (diaper pin vs. cotter pin), or the retention component may be reused resulting in a weakened retention system (reused cotter pins).

Incorrect material type is also a potential cause of failure to retain load pins within shackles. Primary or secondary retention components (keys, wires, cotter pins, etc.) with substandard material characteristics (hardness, ductility, alloy composition) are susceptible to fatigue, breakage and corrosion.

Due to the number of shackles employed in critical lifting and suspension applications across many industries and because the load pins sometimes fail to remain in place and secured as designed, harm to people or equipment remains a potential outcome when shackles are used. Therefore, a need exists for a device that can be used on a variety of shackle and load pin combinations that will positively secure the pin within the shackle, prevent unintended release of a load pin, and be easily installed or removed without the need for special tools.

SUMMARY

According to an aspect of the invention, a shackle apparatus includes a body having a bow portion, and first and second end portions. Each end portion has a pin opening, and a pin is configured to fit through the pin openings. A nut is configured with at least one locking ball to engage with the pin.

According to another aspect of the invention, a shackle apparatus includes a body having a bow portion, and first and second end portions. Each end portion has a pin opening, and a pin is configured to fit through the pin openings. A nut is configured with at least one locking ball for selective engagement with the pin to retain the nut on the pin.

According to another aspect of the invention, a method of operating a shackle, having a body with a bow portion and first and second end portions, includes disposing a pin through a pin opening formed at each end portion of the body and disposing a nut on the pin, wherein the nut is configured with at least one locking ball for selective engagement with the pin to retain the nut on the pin.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present disclosure and should not be used to limit or define the claimed subject matter. The claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness.

Figure 2:
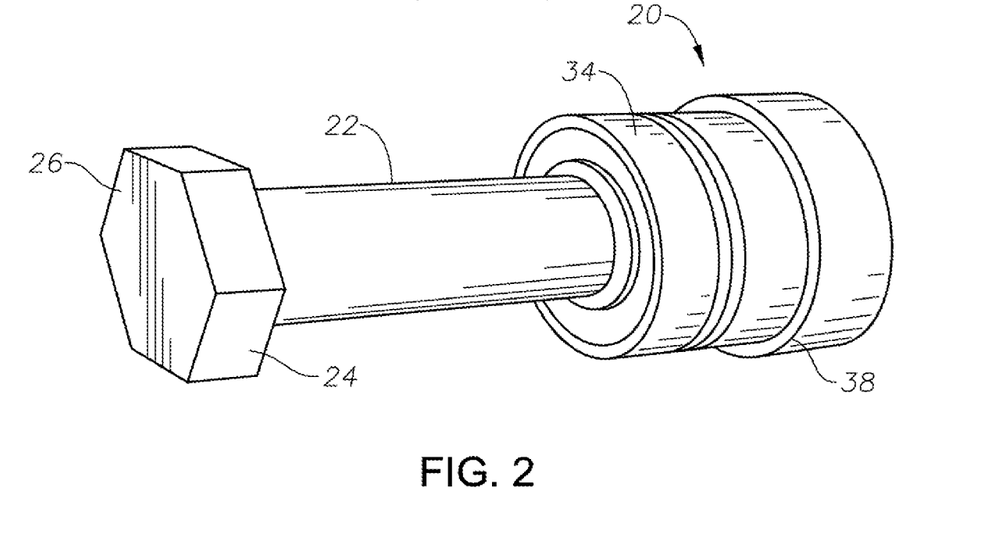
FIG. 2 shows a perspective view of a pin and locking nut according to an example of the present disclosure.
Figure 3:
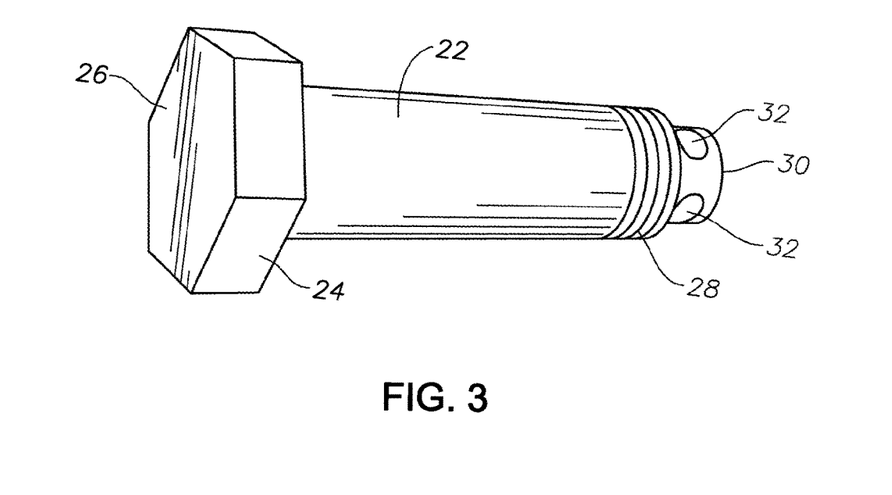
FIG. 3 shows a perspective view of a pin according to an example of the present disclosure.

FIG. 2 shows a perspective view of a nut 20 coupled to a pin 22 embodiment of this disclosure. In some embodiments, the pin 22 is configured with a head 24 at a first end 26 and threads 28 formed at an opposing second end 30, as shown in FIG. 3. The second end 30 is also configured with one or more holes 32 formed thereon, as further described below. It will be appreciated that some pin 22 embodiments may be implemented without threads 28 and only the hole(s) 32 formed at the second end 30.

Figure 4:
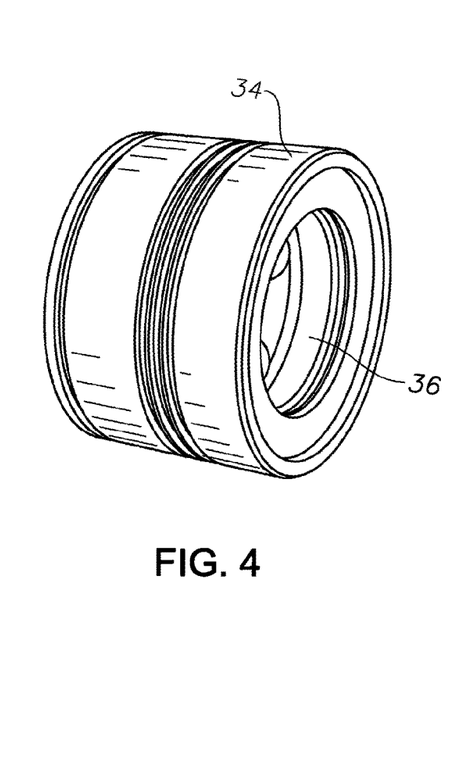
FIG. 4 shows a perspective view of an outer sleeve of a nut according to an example of the present disclosure.
Figure 5:
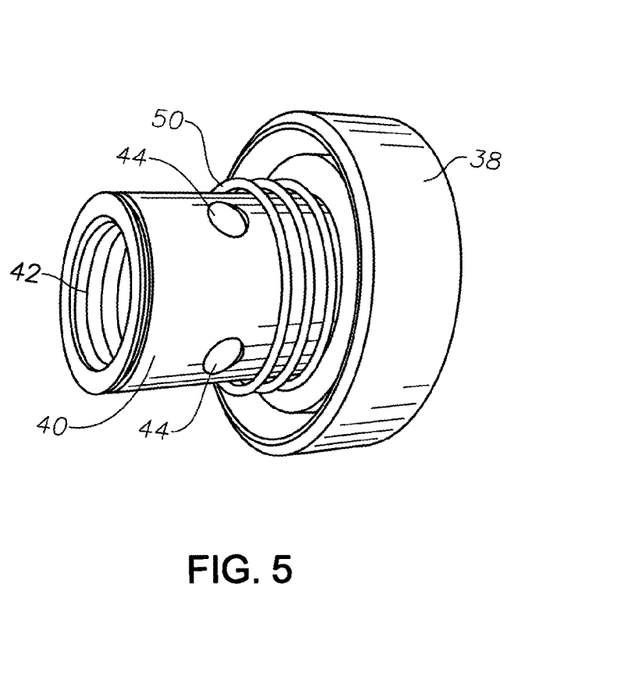
FIG. 5 shows a perspective view of an inner sleeve of a nut according to an example of the present disclosure.

FIG. 4 shows a perspective view of an outer sleeve 34 of a nut 20 embodiment of this disclosure. The outer sleeve 34 is configured with a central bore 36. FIG. 5 shows a perspective view of an inner sleeve 38 of a nut 20 embodiment of this disclosure. The inner sleeve 38 is configured with a shaft 40 section for insertion into the central bore 36 of the outer sleeve 34. In some embodiments, the inner sleeve 38 is configured with internal threads 42 formed near the shaft 40 end to engage with the threads 28 of pin 22 embodiments implemented with threading, as shown in FIG. 3. The inner sleeve 38 is configured with one or more holes 44 to house one or more balls (further described below).

Figure 6A:
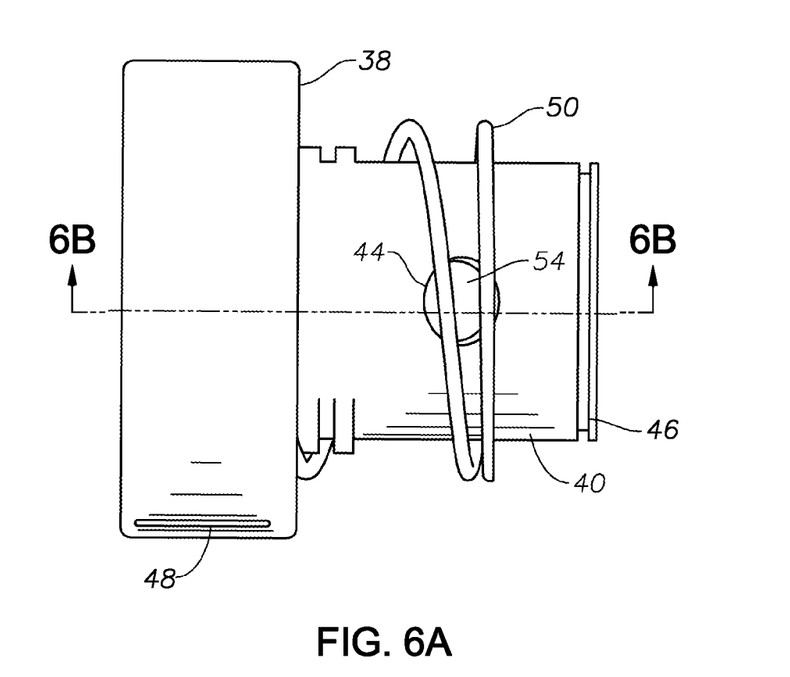
FIG. 6A shows a side view of an inner sleeve of a nut according to an example of the present disclosure.

FIG. 6A shows a side view of an inner sleeve 38 embodiment of this disclosure. The sleeve 38 is configured with a groove 46 formed on the outer diameter surface of the shaft 40 section. The sleeve 38 end opposite the shaft 40 section includes an alignment mark 48 formed on the outer surface. A conventional spring 50 is also disposed over the shaft 40 section.

Figure 6B:
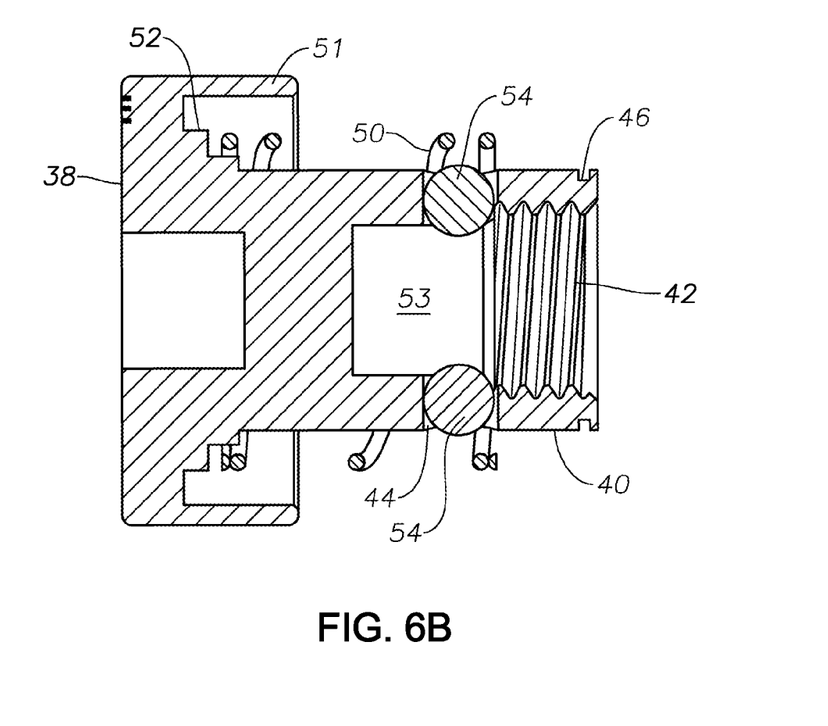
FIG. 6B shows a cross-section schematic of the inner sleeve of FIG. 6A.

FIG. 6B shows a cross-section of the inner sleeve 38 along section A-A as depicted in FIG. 6A. The sleeve 38 end opposite the shaft 40 section is formed as a housing 51 for a stair-stepped outer diameter 52 of the shaft 40 section at the end opposite the inner threaded 42 end. The shaft 40 section is formed with an internal annular void 53 to receive the pin 22 end (see pin end 30 of FIG. 3). One or more holes 44 are also formed along the shaft 40 section near the inner threaded 42 end. Each hole 44 is configured to embrace a locking ball 54. The hole(s) 44 is formed to allow the ball 54 to extend into the internal annular void 53 without passing through and falling into the void 53.

Figure 7A:
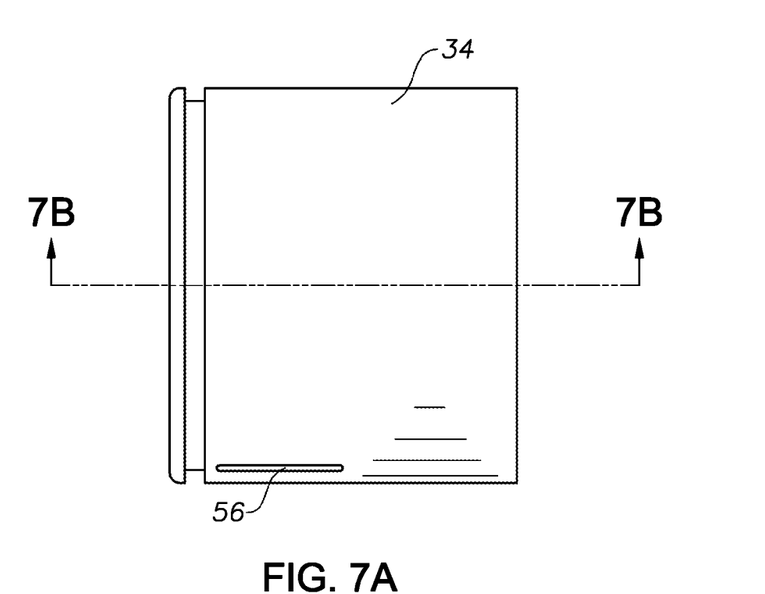
FIG. 7A shows a side view of an outer sleeve of a nut according to an example of the present disclosure.
Figure 7B:
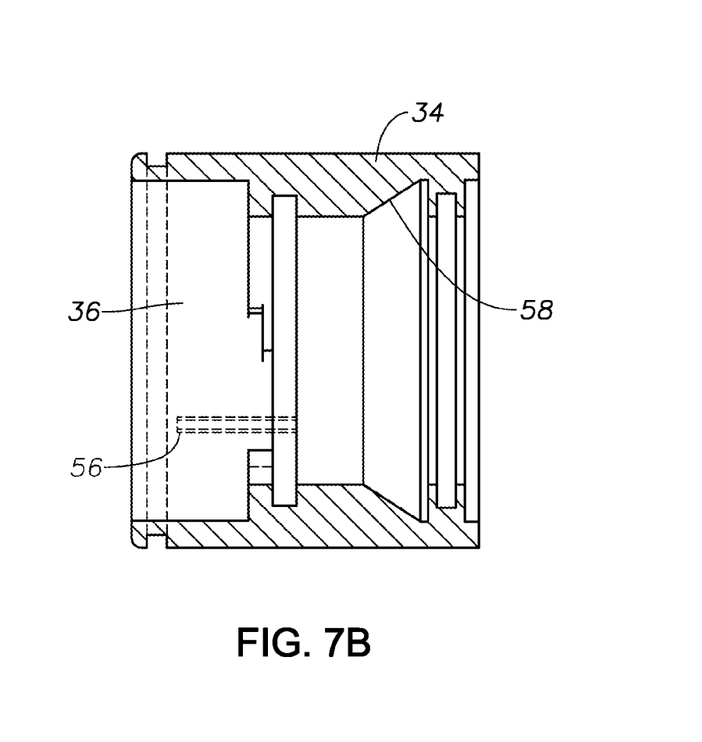
FIG. 7B shows a cross-section schematic of the outer sleeve of FIG. 7A.

FIG. 7A shows a side view of an outer sleeve 34 embodiment of this disclosure. The outer surface of the sleeve 34 includes an alignment mark 56 formed thereon. FIG. 7B shows a cross-section of the outer sleeve 34 along section B-B as depicted in FIG. 7A. The central bore 36 passes through the entire body of the outer sleeve 34. The sleeve 34 is formed with a tapered inner diameter 58 near one end. The tapered inner diameter 58 provides a ramped surface which allows the locking ball(s) 54 on the inner sleeve 38 to move out radially from the hole(s) 44 when the sleeves 34, 38 are actuated as described herein.

Figure 8:
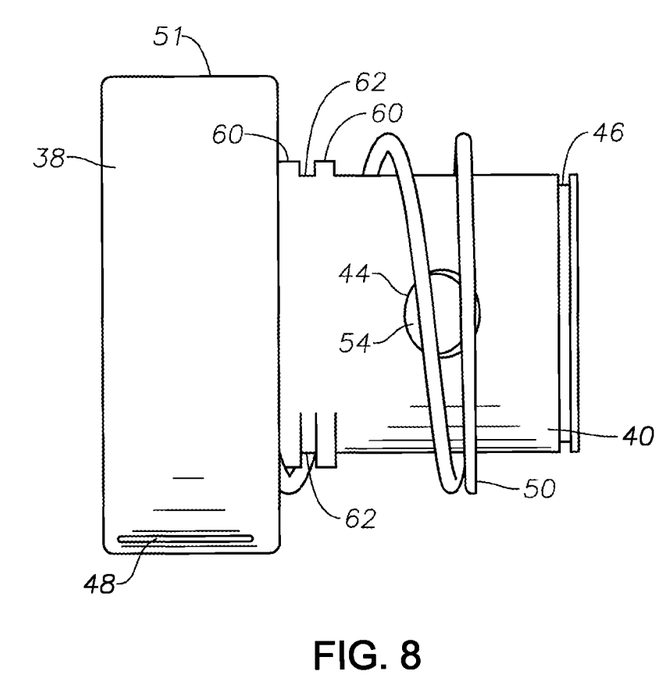
FIG. 8 shows a side view of another inner sleeve of a nut according to an example of the present disclosure.

FIG. 8 shows another side view of an inner sleeve 38 embodiment of this disclosure. The sleeve 38 is configured with a pair of raised parapet 60 sections forming a channel 62. The sleeve 38 is configured with a first parapet 60 section formed 180 degrees from a second parapet 60 section formed on the surface along the outer diameter of the shaft 40 section near the housing 51. Each parapet 60 section runs for a short sector along the shaft 40 section surface. In this manner, the inner sleeve is configured with a pair of channels 62 formed along the outer diameter of the shaft 40 section surface. As shown in FIG. 8, the alignment mark 48 is formed on the outer surface of the sleeve 38 to coincide with the location of one of the channels 62.

Figure 9:
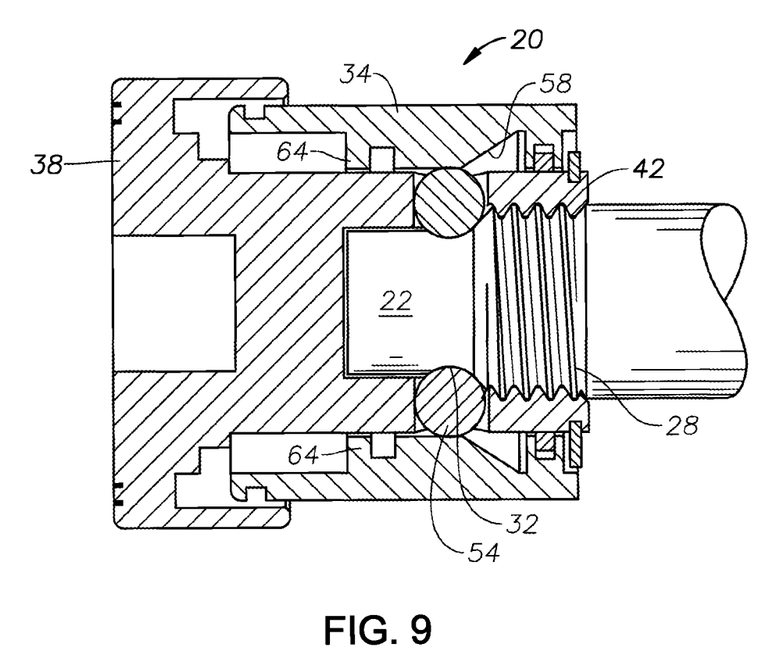
FIG. 9 shows a cross-section schematic of an inner sleeve and outer sleeve engaged to form a nut according to an example of the present disclosure.

Turning to FIG. 9, a cross-section of a nut 20 formed by the mated outer 34 and inner 38 sleeves is shown. The shaft 40 section of the inner sleeve 38 is slidingly engaged within the central bore 36 of the outer sleeve 34. FIG. 9 shows the pin 22 end (see FIG. 3 item 30) securely engaged within the open end of the inner sleeve 38. With the pin 22 engaged with the nut 20 as shown in FIG. 9, each locking ball 54 is pushed into a respective hole 44 on the inner sleeve 38 by the inner surface of the outer sleeve 34. As such, the locking balls 54 engage with the holes 32 formed on the pin 22 end (FIG. 3), thereby retaining the pin from rotation or extraction from the inner sleeve 38. The spring (see FIG. 6A item 50) provides an expansive force between the outer 34 and inner 38 sleeve to keep the locking ball(s) 54 positively engaged within the pin 22 hole(s) 32.

As previously described, the outer sleeve 34 is configured with a tapered inner diameter 58 near the pin 22 receiving end. The tapered inner diameter 58 provides a ramped surface that respectively allows for inward and outward radial movement of the locking ball(s) 54 into or out of the hole(s) 44 on the inner sleeve 38. FIG. 9 shows the outer sleeve 34 in an extended position relative to the inner sleeve 38. In this position, the tapered inner diameter 58 contacts the locking balls 54 at the ramped surface forming the smallest inner diameter, thereby keeping each locking ball 54 fully seated within a hole 44 which in turn keeps the ball engaged within the pin 22 hole 32.

To release the locking ball(s) 54 from engagement with the pin 22 hole(s) 32, the outer sleeve 34 is manually pushed toward the inner sleeve 38 (to the left in FIG. 9) by overcoming the spring 50 force. When the outer sleeve 34 is pushed toward the inner sleeve 38, the ramped surface of the tapered inner diameter 58 will provide a larger inner diameter until there is sufficient space for radial movement of the locking ball(s) 54 to disengage from the pin 22 hole(s) 32, thereby releasing the pin for rotation and extraction from the inner sleeve 38.

To install the nut 20 on the pin 22, the outer sleeve 34 is depressed into the inner sleeve 38 and rotated relative to the inner sleeve in order to align the alignment marks 48, 56. In this position, a pair of extensions 64 formed on the inner surface of the inner sleeve 34 engage with the channels 62 formed on the outer surface of the outer sleeve 38 shaft 40 section, thereby locking the nut 20 in the installation position such that the locking balls 54 are disengaged and the pin 22 end can be inserted into the nut or the nut can be threaded onto the pin 22 for embodiments with threaded pins. The alignment mark 56 on the outer sleeve 34 surface is timed to align with an extension 64.

To lock the nut 20 onto the pin 22, the outer sleeve 34 is manually rotated to offset the alignment marks 48, 56, thereby disengaging the extensions 64 from the channels 62 so the internal spring 50 can move the outer sleeve 34 into the fully extended position. The inner sleeve 38 may need slight rotation about the pin 22 until the outer sleeve 34 snaps into the fully extended position, indicating that the locking balls 54 are seated firmly in the pin 22 holes 32. In the locked position, the outer sleeve 34 prevents outward radial movement of the locking balls 54 as described herein.

To release the nut 20 from the pin 22, the outer sleeve 34 is rotated to align the alignment marks 48, 56 and depressed into the inner sleeve 38, compressing the spring 50 and allowing the locking ball(s) 54 to move radially outward away from the pin 22 and into the larger inside diameter provided by the tapered inner diameter 58 of the outer sleeve 34, thereby releasing the locking ball(s) from the hole(s) 32 in the pin. With pin 22 embodiments configured with a threaded 28 end, the nut 20 can be rotated off the pin once the locking ball 54 is no longer held fast in the pin 22 hole 32.

Figure 10:
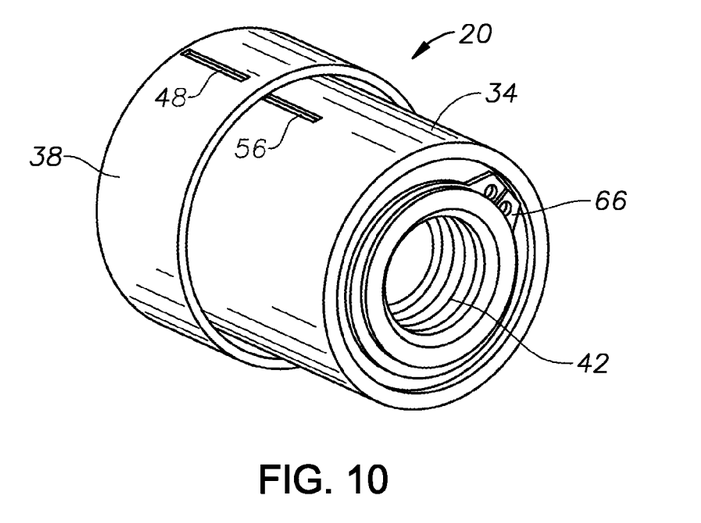
FIG. 10 shows a perspective view of a nut according to an example of the present disclosure.

FIG. 10 shows a perspective view of a nut 20 embodiment of this disclosure. The nut 20 is shown in the installation position with the alignment marks 48, 56 aligned such that the locking balls 54 are disengaged and the pin 22 end can be inserted into the nut 20 as described herein. Some embodiments may be configured with a snap ring 66 mounted in the groove 46 (FIG. 6A) formed on the end of the shaft 40 section to hold the sleeves 34, 38 together.

Figure 11:
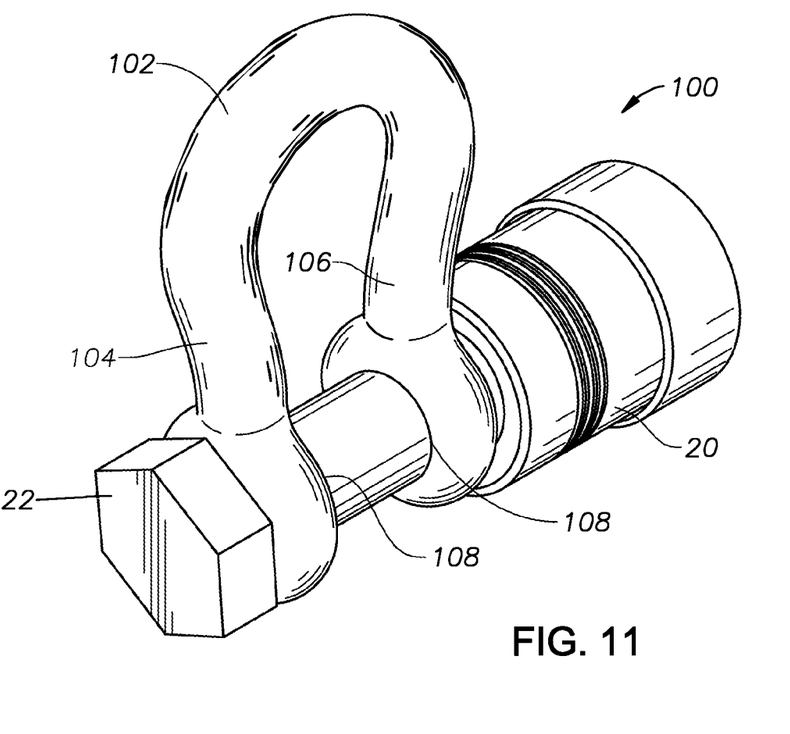
FIG. 11 shows a perspective view of a shackle with a pin secured by a nut according to an example of the present disclosure.

FIG. 11 shows a perspective view of a shackle 100 embodiment of this disclosure. The shackle 100 is configured with a body having a bow portion 102, and first 104 and second 106 end portions. Each end portion 104, 106 is configured with a pin opening 108. A pin 22 is fitted through the pin openings 108 and secured onto the shackle 100 body by a nut 20 configured with at least one locking ball 54 to engage with the pin 22 as disclosed herein.

In light of the example embodiments described and illustrated herein, it will be recognized that numerous modifications could be applied to derive alternative embodiments of the present invention. It will also be appreciated by those skilled in the art that embodiments may be implemented using conventional materials (e.g., steel, metal composites, etc.). What is claimed as the invention, therefore, are all implementations that come within the scope of the following claims.

What is claimed is:

1. A shackle apparatus comprising:
a body having a bow portion, and first and second end portions;
each end portion having a pin opening;
a pin configured to fit through the pin openings;
a nut configured with at least one locking ball to engage with the pin;
the nut comprising an inner sleeve and an outer sleeve;
wherein the outer sleeve is configured with a cylindrical body; and
wherein an inner surface of the cylindrical body is configured to hold the at least one locking ball in place to prevent rotation of the inner sleeve relative to the pin.

2. The shackle apparatus of claim 1 wherein the pin is configured with at least one hole formed thereon to receive the at least one locking ball.

3. The shackle apparatus of claim 1 wherein the pin comprises a head disposed at a first end and threads at a second end.

4. The shackle apparatus of claim 3 wherein the pin is configured with at least one hole formed proximate the threads at the second end to receive the at least one locking ball.

5. The shackle apparatus of claim 3 wherein the nut is configured with internal threads to connect with the threads at the second end of the pin.

6. The shackle apparatus of claim 1 wherein the inner sleeve and the outer sleeve are slidingly engageable with one another for selective engagement and disengagement of the at least one locking ball with the pin.

7. The shackle apparatus of claim 1 further comprising a spring disposed on the nut to exert an expansive force between the inner sleeve and the outer sleeve.

8. The shackle apparatus of claim 1 wherein the at least one locking ball comprises a plurality of locking balls and the pin is configured with a plurality of holes formed thereon to receive the locking balls.

9. A shackle apparatus comprising:
   a body having a bow portion, and first and second end portions;
   each end portion having a pin opening;
   a pin configured to fit through the pin openings;
   a nut configured with at least one locking ball for selective engagement with the pin to retain the nut on the pin;
   the nut comprising an inner sleeve and an outer sleeve;
   wherein the outer sleeve is configured with a cylindrical body; and
   wherein an inner surface of the cylindrical body is configured to hold the at least one locking ball in place to prevent rotation of the inner sleeve relative to the pin.

10. The shackle apparatus of claim 9 wherein the pin is configured with at least one hole formed thereon to receive the at least one locking ball.

11. The shackle apparatus of claim 9 wherein the pin comprises a head disposed at a first end and threads at a second end.

12. The shackle apparatus of claim 11 wherein the pin is configured with at least one hole formed proximate the threads at the second end to receive the at least one locking ball.

13. The shackle apparatus of claim 11 wherein the nut is configured with internal threads to connect with the threads at the second end of the pin.

14. The shackle apparatus of claim 9 wherein the inner sleeve and the outer sleeve are slidingly engageable with one another.

15. The shackle apparatus of claim 9 wherein the at least one locking ball comprises a plurality of locking balls and the pin is configured with a plurality of holes formed thereon to receive the locking balls.

16. A method of operating a shackle having a body with a bow portion and first and second end portions, comprising:
   disposing a pin through a pin opening formed at each end portion of the body;
   disposing a nut on the pin, wherein the nut is configured with at least one locking ball for selective engagement with the pin to retain the nut on the pin;
   wherein the nut comprises an inner sleeve and an outer sleeve;
   wherein the outer sleeve is configured with a cylindrical body; and
   wherein an inner surface of the cylindrical body is configured to hold the at least one locking ball in place to prevent rotation of the inner sleeve relative to the pin.

17. The method of claim 16 wherein the pin comprises a head disposed at a first end and threads at a second end.

* * * * *